(12) United States Patent
Zhu et al.

(10) Patent No.: US 11,117,336 B2
(45) Date of Patent: Sep. 14, 2021

(54) CONFIGURABLE COOLING ASSEMBLY AND COOLING METHOD

(71) Applicant: The Boeing Company, Chicago, IL (US)

(72) Inventors: Alex X. Zhu, Charleston, SC (US); Daniel A. Charles, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 13 days.

(21) Appl. No.: 16/837,226

(22) Filed: Apr. 1, 2020

(65) Prior Publication Data

US 2020/0223163 A1    Jul. 16, 2020

Related U.S. Application Data

(62) Division of application No. 15/365,215, filed on Nov. 30, 2016, now abandoned.

(51) Int. Cl.
*B29C 73/10*        (2006.01)
*B29C 73/12*        (2006.01)
(Continued)

(52) U.S. Cl.
CPC .............. *B29C 73/12* (2013.01); *B29C 35/16* (2013.01); *B29C 65/242* (2013.01); *B29C 73/24* (2013.01); *B32B 27/00* (2013.01); *B32B 37/06* (2013.01); *F28F 7/02* (2013.01); *B29C 73/34* (2013.01); *B29K 2101/10* (2013.01); *B29K 2105/246* (2013.01); *B29K 2105/253* (2013.01); *B29L 2009/00* (2013.01); *B29L 2031/3076* (2013.01); *B32B 2305/77* (2013.01); *B32B 2309/02* (2013.01); *B32B 2398/10* (2013.01); *B32B 2605/18* (2013.01)

(58) Field of Classification Search
CPC ....... B29C 73/12; B29C 35/16; B29C 65/242; B29C 73/24; B32B 27/00; B32B 37/06; F28F 7/02
See application file for complete search history.

(56) References Cited

U.S. PATENT DOCUMENTS 3,833,837 A    9/1974    West
4,497,363 A    2/1985    Heronemus
(Continued)

OTHER PUBLICATIONS

"Dri Baths, Digital and Analog Modular Blocks, and Fixed Baths," Electron Microscopy Sciences, copyright 2016, retrieved Nov. 29, 2016, 7 pages. https://www.emsdiasum.com/microscopy/products/equipment/dri_bath.aspx.

(Continued)

*Primary Examiner* — Jeffry H Aftergut
*Assistant Examiner* — Jaeyun Lee
(74) *Attorney, Agent, or Firm* — Yee & Associates, P.C.

(57) ABSTRACT

A method is provided for managing the temperature of heat sensitive material located near a repair patch being thermally cured on a composite skin using a heating blanket. The method comprises configuring an assembly of thermally conductive cooling blocks to fit within a space between the heating blanket and the heat sensitive material. The assembly of thermally conductive cooling blocks is then installed against the skin within the space, forming a heat sink that conducts a portion of heat out of the composite skin away from the heat sensitive material.

20 Claims, 9 Drawing Sheets

(51) Int. Cl.
*B29C 35/16* (2006.01)
*B29C 73/24* (2006.01)
*B29C 65/24* (2006.01)
*B32B 27/00* (2006.01)
*B32B 37/06* (2006.01)
*F28F 7/02* (2006.01)
*B29C 73/34* (2006.01)
*B29K 101/10* (2006.01)
*B29K 105/24* (2006.01)
*B29K 105/00* (2006.01)
*B29L 9/00* (2006.01)
*B29L 31/30* (2006.01)

(56) References Cited

U.S. PATENT DOCUMENTS

| | | |
|---|---|---|
| 5,753,271 A | 5/1998 | Heimerdinger |
| 5,799,943 A | 9/1998 | Morgan |
| 6,036,464 A | 3/2000 | Heimerdinger et al. |
| 6,355,203 B1 | 3/2002 | Charmes et al. |
| 9,233,438 B2 | 1/2016 | Phelan et al. |
| 2007/0121294 A1 | 5/2007 | Campbell et al. |
| 2013/0216445 A1 | 8/2013 | Hartvigsen et al. |
| 2014/0200731 A1 | 7/2014 | Evens et al. |
| 2014/0290831 A1* | 10/2014 | Hatano ........ B29C 73/10 156/94 |
| 2015/0366105 A1 | 12/2015 | Dunwoody et al. |
| 2018/0147800 A1 | 5/2018 | Zhu et al. |
| 2019/0003786 A1 | 1/2019 | Birkett et al. |

OTHER PUBLICATIONS

Asynt ChilliBlock System, "A fresh outlook in chemistry technologies," retrieved Nov. 29, 2016, 2 pages. http://www.asynt.com/product/asynt-chilliblock-system/.

Humfeld, "System and Method for Forming a Composite Part," U.S. Appl. No. 14/794,238, filed Jul. 8, 2015, 28 pages.

Extended European Search Report, dated May 3, 2018, regarding Application No. 17199095.5, 9 pages.

Office Action, dated Jul. 25, 2019, regarding U.S. Appl. No. 15/365,215, 17 pages.

Final Office Action, dated Dec. 26, 2019, regarding U.S. Appl. No. 15/365,215, 11 pages.

* cited by examiner

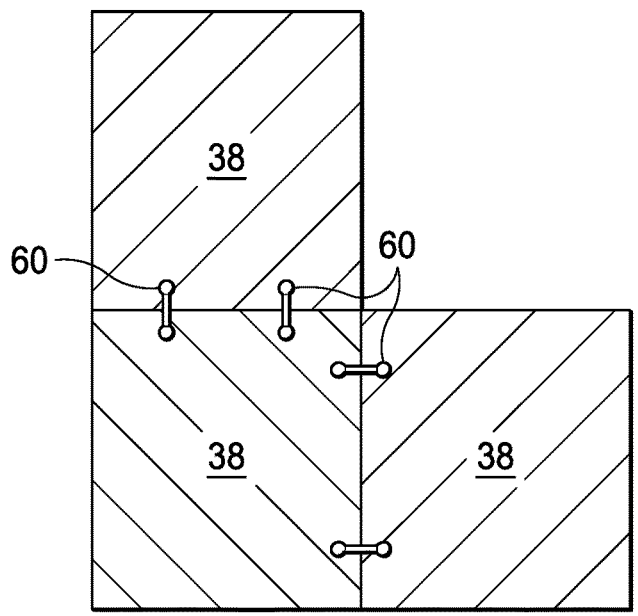
FIG. 8
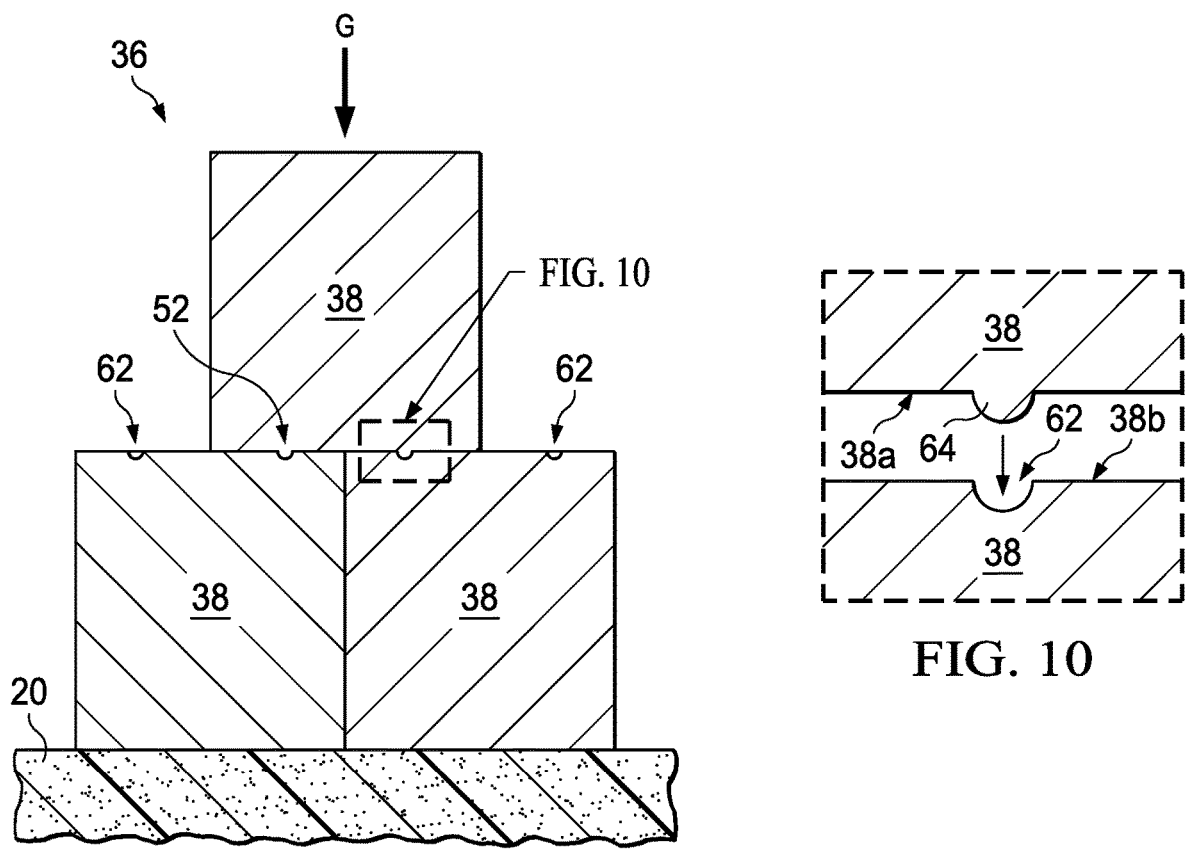
FIG. 9
FIG. 10

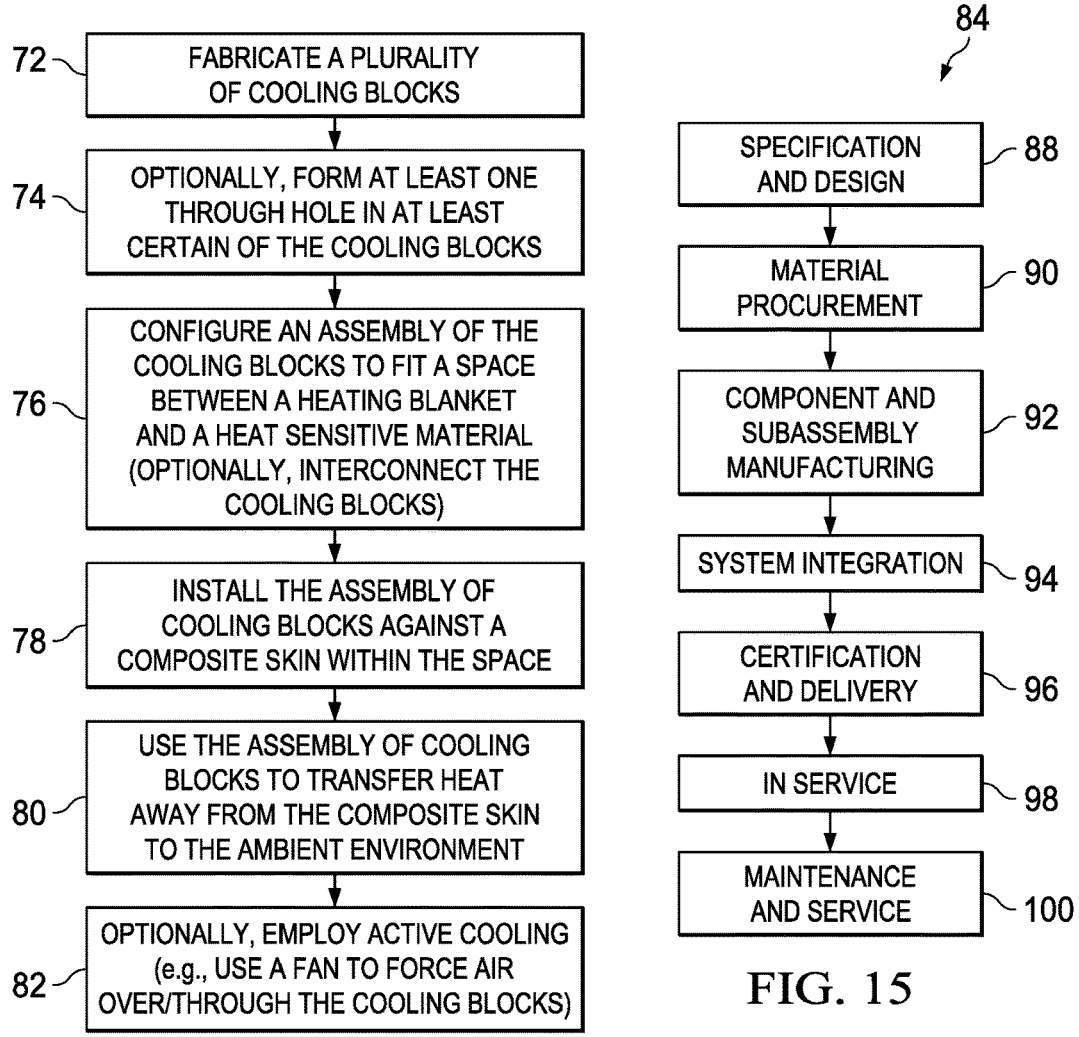
FIG. 14
FIG. 15
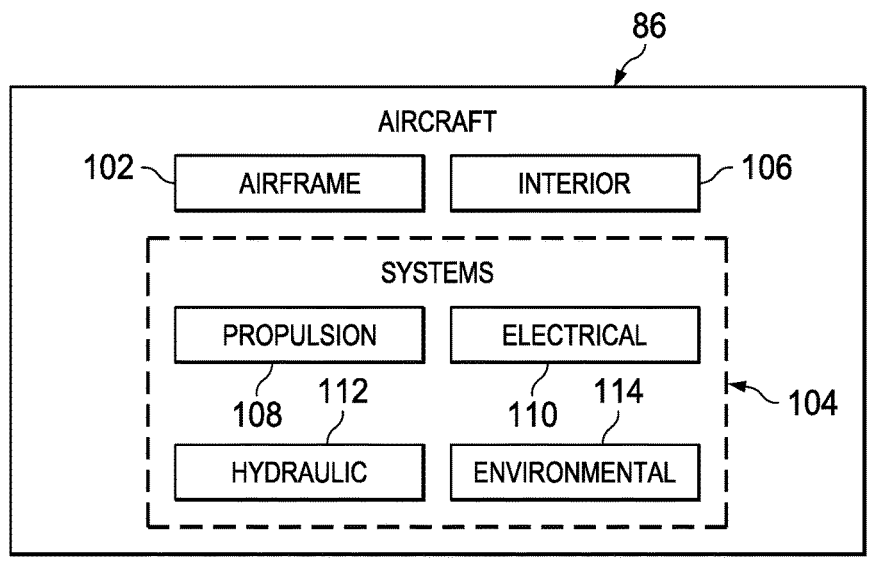
FIG. 16

CONFIGURABLE COOLING ASSEMBLY AND COOLING METHOD

CROSS-REFERENCE TO RELATED APPLICATION

This application is a divisional of and claims the benefit of U.S. patent application Ser. No. 15/365,215 entitled "Configurable Cooling Assembly and Cooling Method," filed Nov. 30, 2016. Accordingly, U.S. patent application Ser. No. 15/365,215 is incorporated herein by reference in its entirety.

BACKGROUND INFORMATION

1. Field

The present disclosure generally relates to systems and methods for cooling structures and deals more particularly with an array of configurable cooling blocks for conducting heat away from a structure.

2. Background

It is sometimes necessary to protect heat sensitive structures against overheating. For example, in order to carry out an in-situ repair of a composite structure such as a composite aircraft skin, a heating blanket is used to thermally cure a composite repair patch placed on area of the skin requiring repair. In some cases, the skin repair area is located close to heat sensitive materials (HSM) such as an underlying peened titanium or aluminum stiffener.

Depending on the difficulty of the application, shot bags that act as heat sinks, chilled air and/or fans can be used to cool the skin between the edge of the heating blanket and the HSM, in order to prevent overheating of the HSM. In other applications, however, the distance between the edge of the heating blanket and the HSM may be relatively small, for example on the order of a few inches, limiting the effectiveness of cooling fans. The challenge of preventing overheating of HSMs is made more difficult by complicated structural geometries and repair areas that are hard-to-reach.

SUMMARY

The disclosure relates in general to cooling of structures to prevent overheating of HSMs, and more specifically to a configurable cooling assembly for use in conducting heat away from HSMs in the proximity of a bonded repair.

According to one aspect, a method is provided for managing the temperature of heat sensitive material located near a repair patch being thermally cured on a composite skin using a heating blanket. The method comprises configuring an assembly of thermally conductive cooling blocks to fit within a space between the heating blanket and the heat sensitive material. The assembly of thermally conductive cooling blocks is then installed against the skin within the space, forming a heat sink that conducts a portion of heat out of the composite skin away from the heat sensitive material.

According to another aspect, a method is provided for managing the temperature of heat sensitive material. The method comprises configuring an assembly of thermally conductive cooling blocks to fit within a predetermined volume of space between a heat source and the heat sensitive material, wherein the heat source and heat sensitive material are connected by a physical structure. The assembly of thermally conductive cooling blocks is installed against the physical structure within the space, forming a heat sink that conducts a portion of heat out of the physical structure away from the heat sensitive material.

According to still another aspect, a method is provided for managing the temperature of heat sensitive material located near a repair patch being thermally cured on a composite skin using a heating blanket. The method comprises configuring an assembly of thermally conductive cooling blocks to fit within a space between the heating blanket and the heat sensitive material, wherein certain of the cooling blocks comprise at least one through-hole allowing air to pass therethrough. The assembly of cooling blocks is configured to comprise at least one layer of cooling blocks with no through-holes, at least one layer of cooling blocks with one through-holes, and at least one layer of cooling blocks with more than one through-holes. The assembly of thermally conductive cooling blocks is installed against the skin within the space, forming a heat sink that conducts a portion of heat out of the composite skin away from the heat sensitive material. The layer of cooling block with no through-holes is placed closest to the composite skin.

One of the advantages of the cooling assembly is that it is simple, passive, may be installed in tight spaces and is readily configurable to suit unusual or complex geometries of a structure requiring cooling. Another advantage of the cooling assembly is that it is reusable and can be reconfigured to achieve different heat sink shapes and levels of cooling required in different applications. A further advantage of the cooling assembly is that it avoids the need for interrupting thermal curing of a composite patch when there is a risk of overheating of the adjacent HSMs.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 8 is an illustration of an end view of several cooling blocks, showing a further form of interconnection between the cooling blocks.

FIG. 9 is an illustration of an end view of several the cooling blocks held against an underlying composite skin by the force of gravity.

FIG. 10 is an illustration of the area designated as "FIG. 10" in FIG. 9.

FIG. 14 is an illustration of a flow diagram of a method for cooling a structure that includes HSMs.

FIG. 15 is an illustration of a flow diagram of aircraft production and service methodology.

FIG. 16 is an illustration of a block diagram of an aircraft.

DETAILED DESCRIPTION

Figure 1:
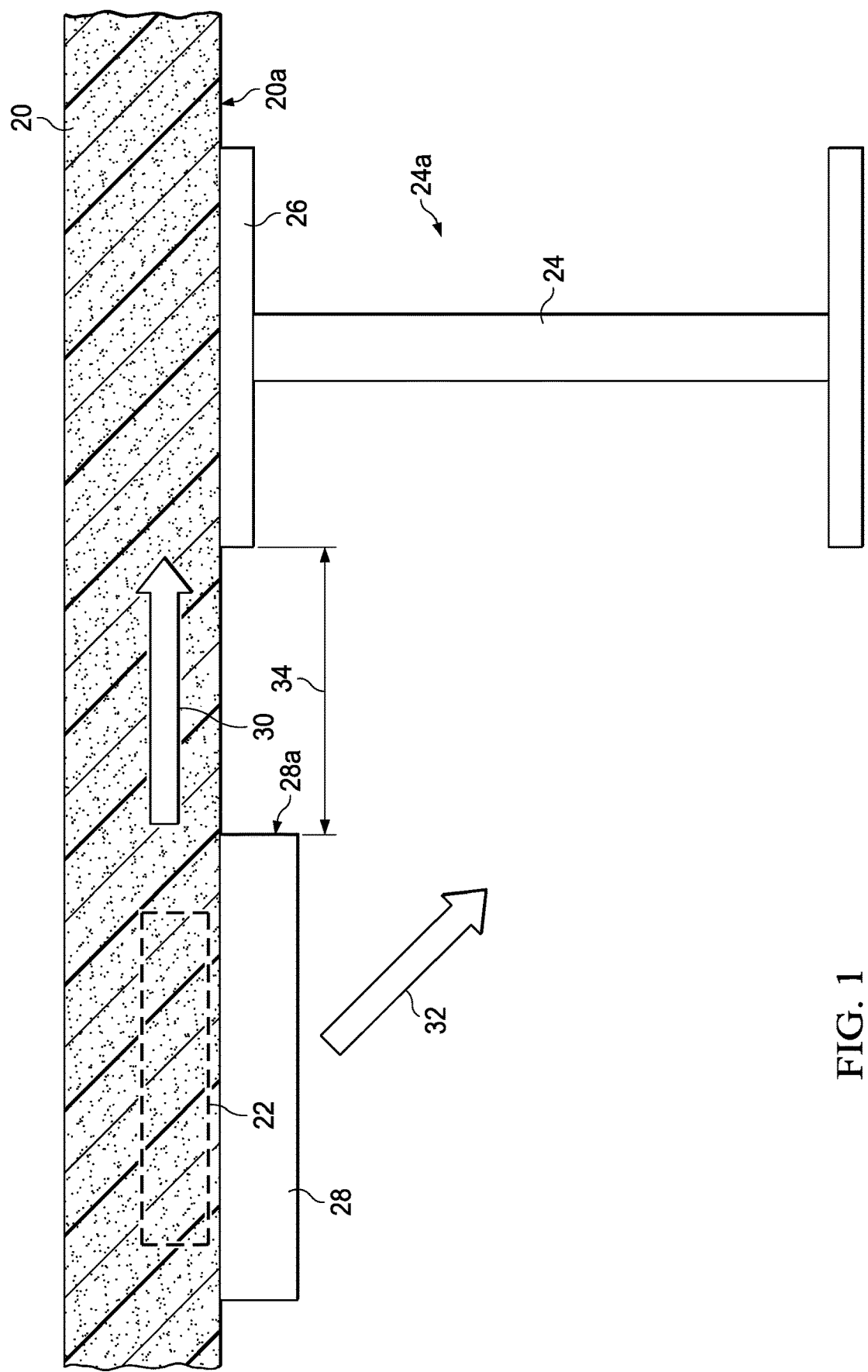
FIG. 1 is an illustration of a diagrammatic cross-sectional view of a composite skin in which an HSM is located near an area of skin requiring repair.

FIG. 1 illustrates a composite laminate structure such as a composite aircraft skin 20 having an area 22 (hereinafter "repair area") requiring in-situ repair or rework in order to correct an out-of-specification condition such as impact damage. Although not shown in the Figures, the repair is carried out using a cured or uncured composite laminate patch that is bonded to the skin 20 using a bonding adhesive. A curing assembly (not shown) that includes a heating blanket 28, is used to thermally cure the bonding adhesive and/or the repair patch, which is typically comprised of a fiber reinforced, thermoset or a thermoplastic laminate. The curing assembly may also include a vacuum bag (not shown) that is used to compact the repair patch during the cure process.

The repair area 22 is located near a heat sensitive material (HSM) 24 which, in the illustrated example, comprises a structural stiffener 24a having a cap 26 which is bonded or otherwise fixed to the surface 20a of the skin 20. A minimal amount of space 34 is present between the edge 28a of the heating blanket 28 and the HSM 24. The stiffener 24a may comprise a HSM 24 such as, for example and without limitation, a peened titanium or aluminum which may be impacted if heated above a certain temperature. The temperature at which the HSM 24 is impacted is less than the cure temperature (in the case of a thermoset patch) or consolidation temperature (in the case of a thermoplastic patch) of the repair patch. For convenience in the remaining description "cure temperature" refers to the cure temperature of a composite laminate repair patch formed of a thermosetting polymer resin, a thermoplastic polymer resin, hybrid material systems containing both thermosets and thermoplastics, and bonding adhesives used to bond such patches to an underlying structure such as the skin 20. Peened titanium stiffener 24a may be impacted when exposed to temperatures exceeding 200° F. whereas the heating blanket 28 may generate temperatures well in excess of 200° F., for example 300-350° F. for a thermoset repair patch. During thermal curing of the repair patch, thermal energy generated by the heating blanket 28 is transferred both by conduction 30 through the skin 20 and radiation 32 to the stiffener 24a, thereby raising the temperature of the HSM 24.

Figure 2:
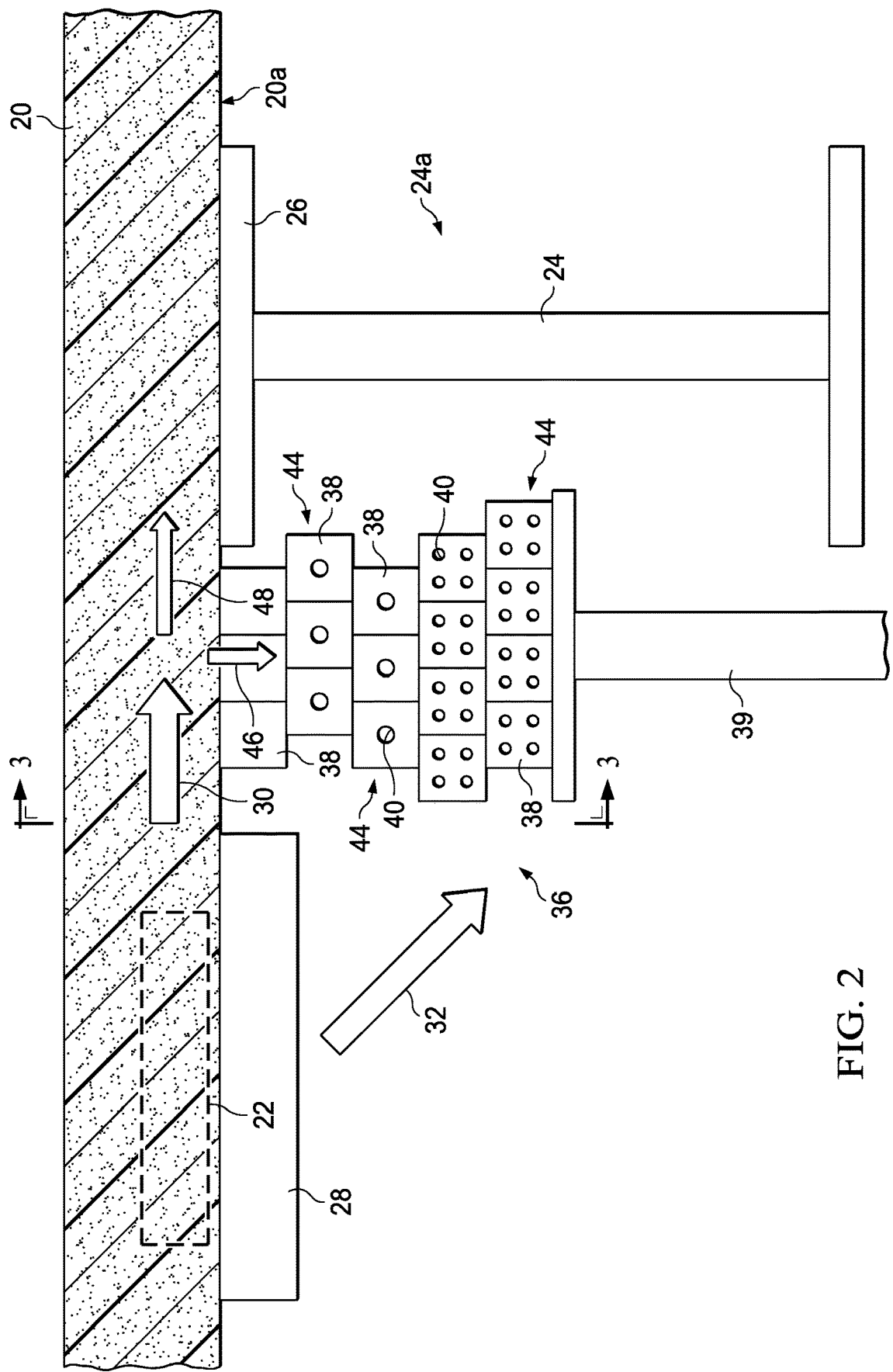
FIG. 2 is an illustration similar to FIG. 1 but showing installation of a configurable cooling block assembly.
Figure 3:
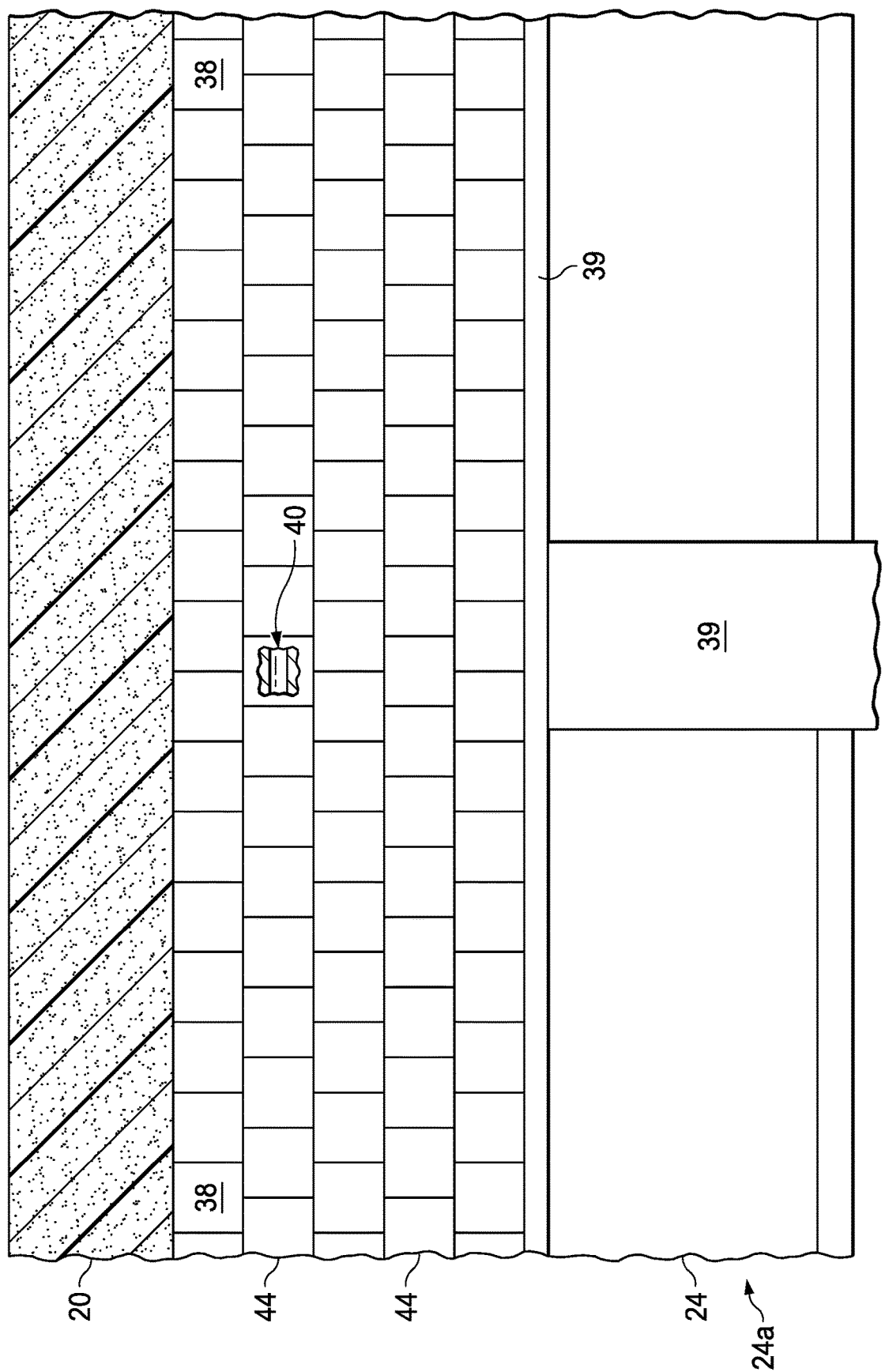
FIG. 3 is an illustration of a sectional view taken along the line 3-3 in FIG. 2, wherein one of the cooling blocks is broken away in section to reveal an internal through-hole.
Figure 4:
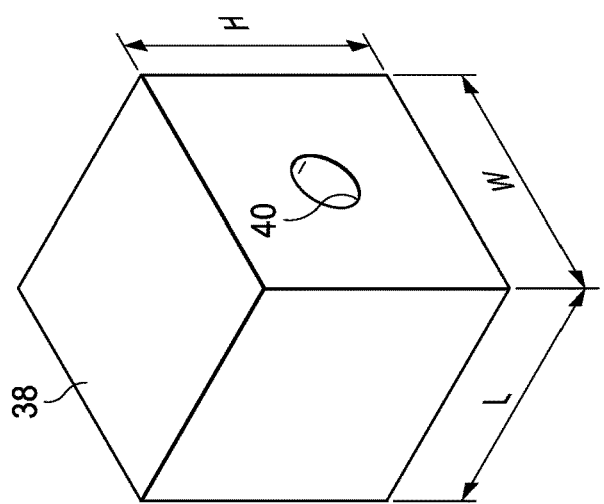
FIG. 4 is an illustration of a perspective view of one of the cooling blocks forming part of the configurable cooling block assembly.

Referring now to FIG. 2-4, an assembly 36 of thermally conductive cooling blocks 38 (hereinafter "cooling block assembly", arranged in a three-dimensional array, is placed against the surface 20a of the skin 20. As will be discussed below in more detail, the cooling block assembly 36 is used to manage the temperature of the HSM 24. The cooling block assembly 36 is configured to fit within the space 34 (FIG. 1) between the edge of the heating blanket 28 and the cap 26 of the stiffener 24a. In the illustrated example, the cooling block assembly 36 comprises a three-dimensional array of individual cooling blocks 38, arranged in five layers on an underlying support that holds the cooling block assembly 36 against the skin surface 20a. In the Figures, the support 39 comprises a flat plate driven upwardly by a jack or similar force applicator, forcing the assembly 36 of cooling blocks 38 against the skin surface 20a. However, a variety of other means of supporting the cooling blocks 38 and forcing them against the skin surface 20a are possible, such as straps, scaffolding, etc. While five layers 44 of cooling blocks 38 are illustrated in FIGS. 2 and 3, more than five layers 44 or as few as one layer 44 may be suitable, depending upon the application. Also, while the layers 44 of cooling blocks 38 are shown as staggered relative to each other in FIGS. 2 and 3 to increase the exposed surface area of the assembly, they may be vertically aligned so as to form rows and columns.

The cooling block assembly 36 manages the temperature of the HSM 24 by acting as a heat sink, conducting a portion 46 of the heat out of the skin away from the HSM 24, such that only a residual portion 48 of the heat conducted through the skin 20 reaches the HSM 24. The amount of heat that is conducted away from the skin 20 by the cooling block assembly 36 will depend on a number of factors, including but not limited to the number of cooling blocks 38 in contact with the surface 20a of the skin 20, the thermal conductivity of the cooling blocks 38, the collective mass of the cooling blocks 38 and the surface area of the cooling blocks 38 that is exposed to the surrounding environment. In addition to reducing the heat conducted through the skin 20 to the HSM 24, the cooling block assembly 36 also absorbs heat that is radiated 32 by the heating blanket 28, which would otherwise impact the HSM 24.

As best seen in FIG. 4, each of the cooling blocks 38 is in the shape of a cube, having a height H, width W, and length L dimensions that are equal. In other examples, however, these dimensions may be unequal. For example, each of the cooling blocks 38 maybe elongate, wherein its length L is considerably greater than either its height H or width W. Further, while the illustrated cooling block 38 is a shape that has flat sides which maximize the surface contact between the cooling blocks 38, other shapes are possible. For example, the cooling blocks 38 may be rectangular, cylindrical or pyramidal in shape, to name only a few possibilities. The surfaces of the cooling blocks 38 should have smooth surfaces with minimal porosity in order to maximize heat transfer between the interfacial boundaries of adjacent blocks 38. The cooling blocks 38 are formed of a material that is relatively high in thermal conductivity and is easily machined, such as, without limitation, copper or aluminum, or an alloy of these two or other thermally conductive materials. The thermal conductivity of the cooling blocks 38 should be sufficient to result in minimal residual heat conduction 48 to the HSM 24.

Depending on the application, certain cooling blocks 38 may have one or more through-holes 40 therein, each of which has a suitable diameter. In the illustrated example, the top or first layer 44 of cooling blocks 38 in contact with the skin 20 do not have any through-holes 40, while the cooling blocks 38 in the second and third layers 44 each have a single through-hole 40, and the cooling blocks 38 in the fourth and fifth layers 44 each have four through-holes 40. The through-holes 40 increase the exposed surface area of the cooling blocks 38 and therefore increase the amount of heat that is radiated away from the cooling blocks 38 to the surrounding environment. In applications where the space 34 (FIG. 1) between the edge 28*a* of the heating blanket 28 and the HSM 24 is relatively small, it may be desirable to use cooling blocks 38 closest to the skin 20 that do not have through-holes 40 because the absence of through-holes 40 increases the thermal mass of those cooling blocks 38, allowing them to conduct heat away from the skin 20 more quickly.

Figure 5:
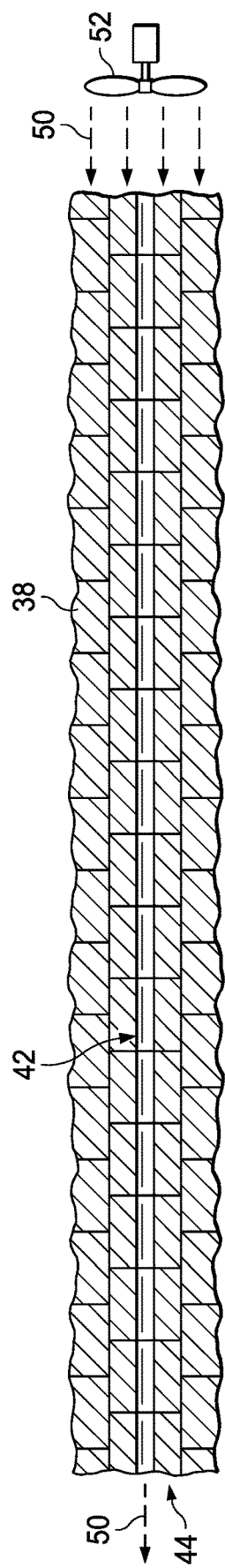
FIG. 5 is an illustration of a fragmentary side view of one row of the cooling blocks shown in FIGS. 2 and 3, wherein the blocks are broken away in section to reveal a continuous air passageway through the row.

Referring now also to FIG. 5, in one example, the cooling blocks 38 are arranged such that the through-holes 40 are aligned to form continuous air passageways 42 through the cooling block assembly 36, allowing passive convection cooling. Optionally, active cooling may be achieved by employing a fan 52 or other forced air source to force air 50 through the passageways 42. The air 50 flowing through the passageways 42 draws heat away from the cooling block assembly 36, thereby enhancing its ability to cool the skin 20 and reduce elevation of the temperature of the HSM 24 caused by the heating blanket 28.

Figure 6:
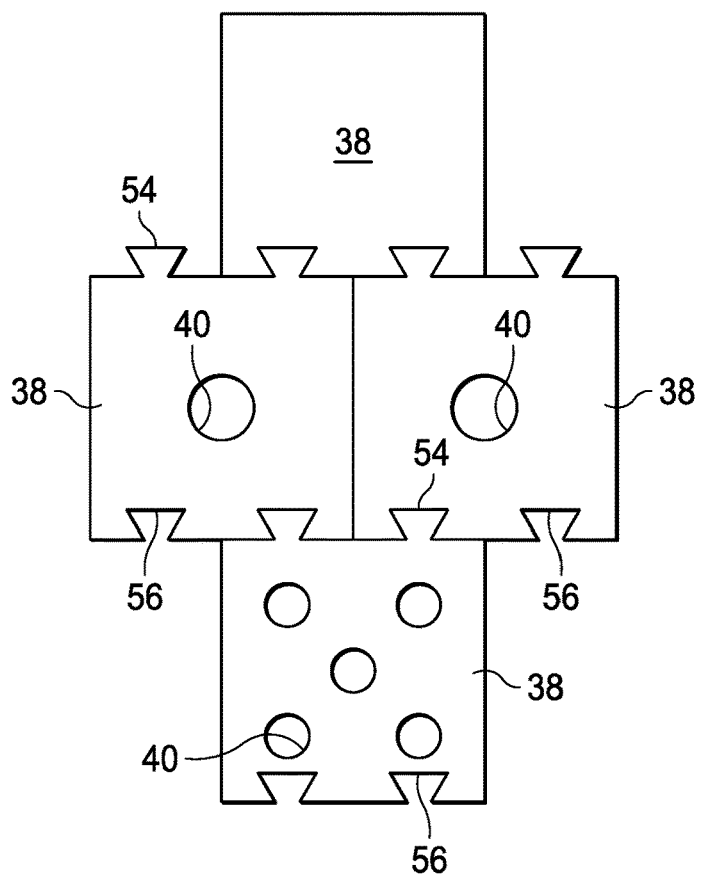
FIG. 6 is an illustration of an end view of several of the cooling blocks, showing one form of interconnection between the cooling blocks.
Figure 7:
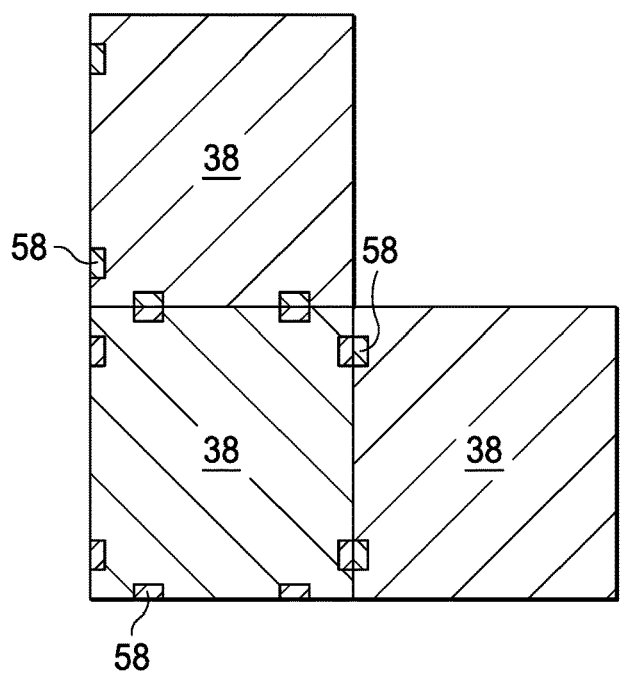
FIG. 7 is an illustration of an end view of several cooling blocks, showing another form of interconnection between the cooling blocks.

Depending on the application, it may be necessary or desirable to releasably connect the cooling blocks 38 together, either by releasable mechanical interconnections, adherents or other means. FIG. 6 illustrates one arrangement for mechanically interconnecting the cooling blocks 38 using interlocking gibs 54 and ways 56 which allow the cooling blocks 38 to be slidably assembled with each other. FIG. 7 illustrates another arrangement in which each of the cooling blocks 38 includes one or more recessed magnets 58. The magnets 58 in adjacent cooling blocks 38 are aligned with and attract each other, holding the cooling blocks 38 together in the assembly 36 by magnetic forces. FIG. 8 illustrates a further arrangement in which pins or releasable snap fit fasteners 60, such as, without limitation, ball and socket connections are used to interconnect the cooling blocks 38. In some applications the fasteners 60 may comprise simple pins. A variety of other techniques can be used to hold the cooling blocks 38 together as an assembly 36, including but not limited to thermally conductive adhesives.

FIGS. 9 and 10 illustrate another example in which an assembly 36 of cooling blocks 38 (only three of which are shown in the Figures) are held against a composite skin 20 using the force of gravity G. In order to locate and position layers of the cooling blocks 38 relative to each other, the bottom 38*a* of each of the cooling blocks 38 is provided with one or more raised locating balls 64 that are received within corresponding indexing recesses 62 in the top surfaces 38*b* of an underlying cooling block 38.

Figure 11:
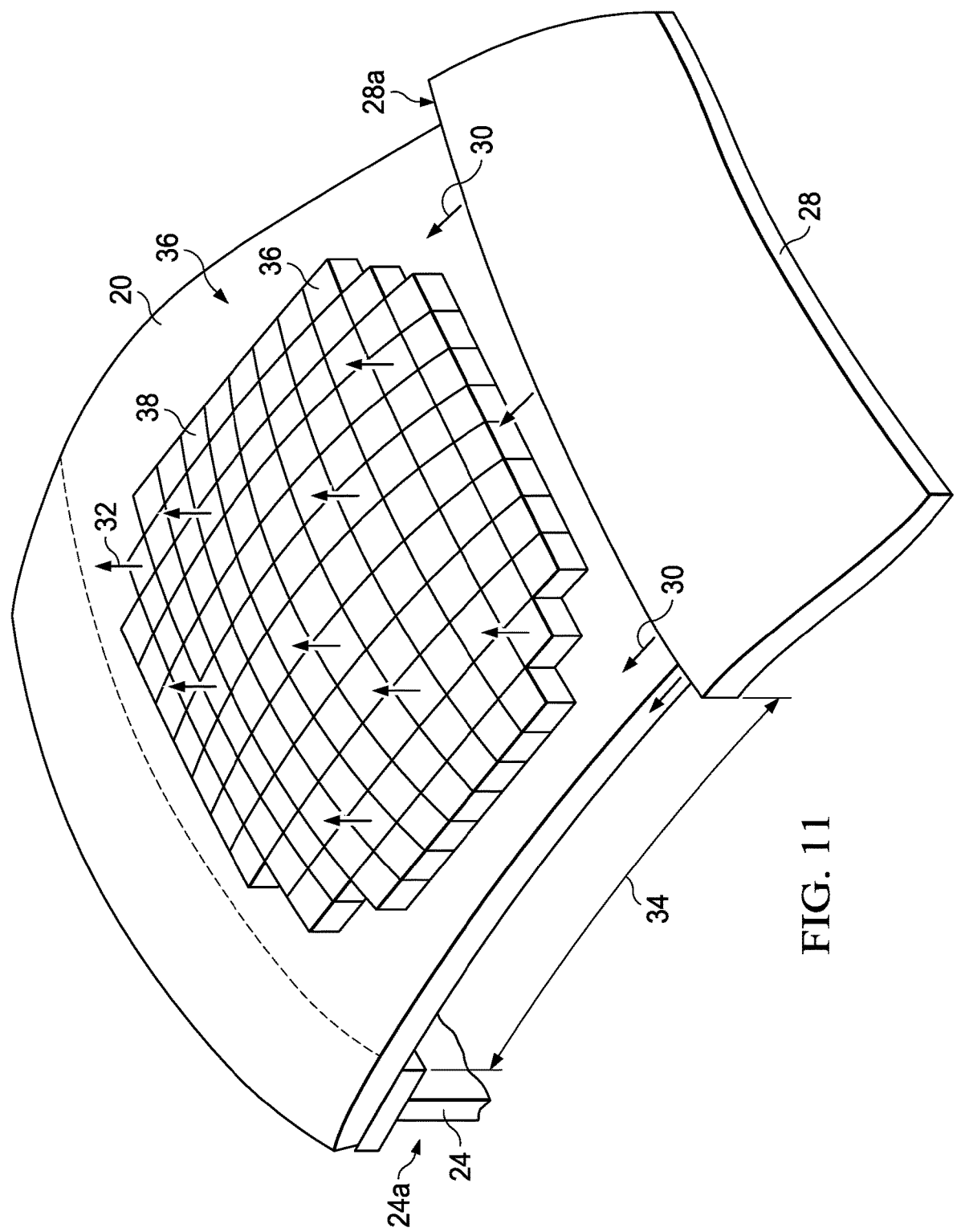
FIG. 11 is an illustration of a fragmentary, perspective view showing use of the cooling blocks during repair of a composite skin curved in two dimensions.
Figure 12:
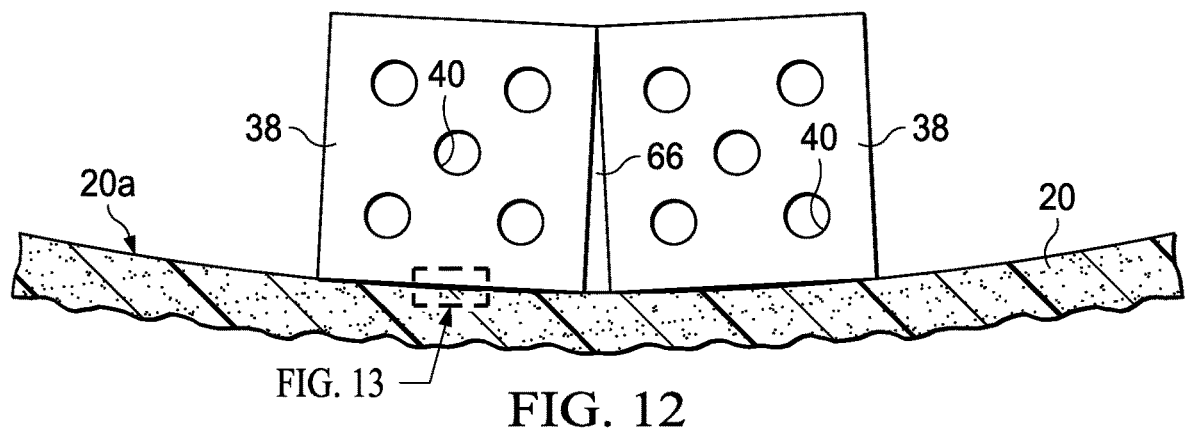
FIG. 12 is an illustration of an end view of two of the cooling blocks supported on an underlying contoured skin surface.
Figure 13:
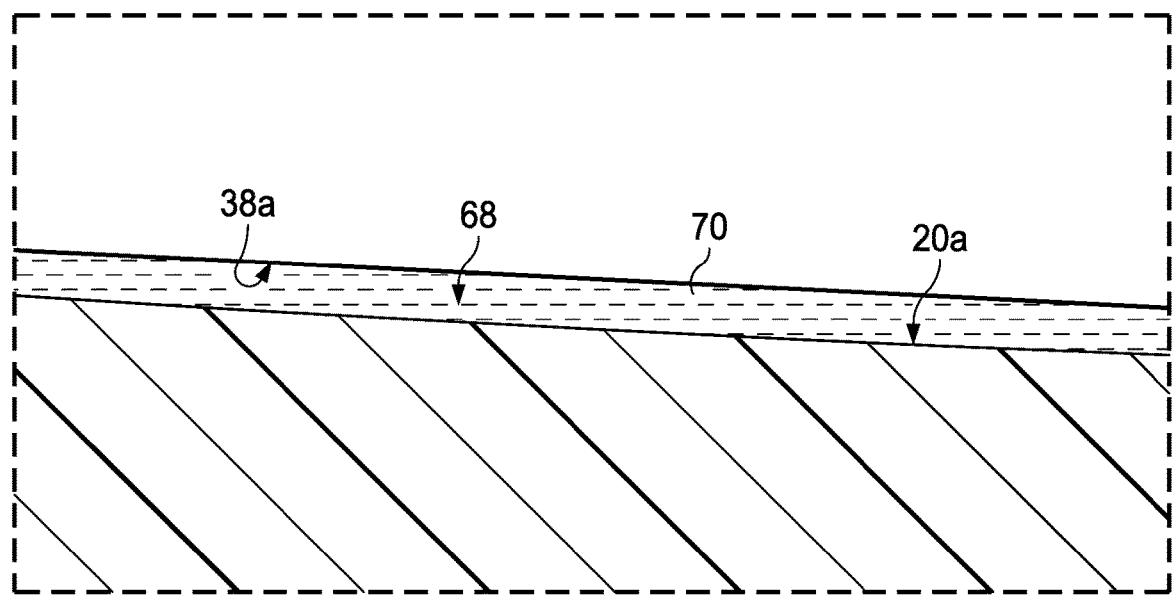
FIG. 13 is an illustration of the area designated as "FIG. 13" in FIG. 12.

The cooling block assembly 36 may be used to conduct heat away from a curved or contoured composite skin 20. For example, referring to FIGS. 11-13, one or more layers 44 of cooling blocks 38 are arranged on top of a composite skin 20, positioned within a space 34 between the edge 28*a* of a heating blanket 28, and an underlying stiffener 24*a* formed of a HSM 24. The composite skin 20 is curved in two dimensions, and the cooling block assembly 36 substantially conforms to the contour of the skin 20. Referring particularly to FIGS. 12 and 13, the bottom 38*a* of each cooling block 38 is substantially flat, and thus forms a slight gap 68 (FIG. 13) between the cooling block 38 and the skin surface 20*a*.

Depending on the application, a thermally conductive liquid shim 70 may be used to fill the gap 68 in order to prevent or minimize reduction of the heat transferred from the skin 20 to the cooling blocks 38. Depending on the degree of curvature of the skin surface 20*a*, a relatively small, pie-shaped gap 66 may be formed between the walls of adjacent ones of the cooling blocks 38. The gaps 66 may be used to allow convective air currents to pass through the cooling block assembly 36, optionally aided by a fan (FIG. 5) that forces air through the gap 66. Alternatively, the gaps 66 may be filled with the liquid shim 70. In some applications, thermally conductive metal shims (not shown) may be employed to fill either of the gaps 66, 68.

FIG. 14 illustrates a method for cooling a structure such as a skin 20 that includes a heat sensitive material 24. Beginning at 72, a plurality of cooling blocks 38 are fabricated, and optionally at 74, at least one through hole 40 is formed in at least certain of the cooling blocks 38. At 76, an assembly 36 of the cooling blocks 38 is configured to fit a space 34 between a heating blanket 28 and the heat sensitive material 24. Optionally, the cooling blocks 38 may be interconnected. At 78, the assembly 36 of the cooling blocks 38 is installed against the composite skin 20 within the space 34 between the heating blanket 28 and the heat sensitive material 24. At 80, the assembly 36 of cooling blocks 38 is used to transfer heat away from the composite skin 20 to the ambient environment. Optionally, as shown at 82, active cooling may be employed, as by using a fan 52 to force air 50 over/through the cooling blocks 38.

Embodiments of the disclosure may find use in a variety of potential applications, particularly in the transportation industry, including for example, aerospace, marine, automotive applications and other application where heat sensitive materials must be protected from overheating. Thus, referring now to FIGS. 15 and 16, embodiments of the disclosure may be used in the context of an aircraft manufacturing and service method 84 as shown in FIG. 15 and an aircraft 86 as shown in FIG. 16. Aircraft applications of the disclosed embodiments may include, for example, without limitation, fuel and hydraulic systems that use tubes containing pressurized fluids. During pre-production, exemplary method 84 may include specification and design 88 of the aircraft 86 and material procurement 90. During production, component and subassembly manufacturing 92 and system integration 94 of the aircraft 86 takes place. Thereafter, the aircraft 86 may go through certification and delivery 96 in order to be placed in service 98. While in service by a customer, the aircraft 86 is scheduled for routine maintenance and service 100, which may also include modification, reconfiguration, refurbishment, and so on.

Each of the processes of method 84 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16 the aircraft 86 produced by exemplary method 84 may include an airframe 102 with a plurality of systems 104 and an interior 106. The airframe 102 may include heat sensitive materials that must be protected from overheating during for example, thermal curing of composite repairs. Examples of high-level systems 104 include one or more of a propulsion system 108, an electrical system 110, a hydraulic system 112 and an environmental system 114. Any number of other systems may be included. Although an aerospace example is shown, the principles of the disclosure may be applied to other industries, such as the marine and automotive industries.

Systems and methods embodied herein may be employed during any one or more of the stages of the production and service method 84. For example, components or subassemblies corresponding to production process 92 may be fabricated or manufactured in a manner similar to components or subassemblies produced while the aircraft 86 is in service. Also, one or more apparatus embodiments, method embodiments, or a combination thereof may be utilized during the production stages 92 and 94, for example, by substantially expediting assembly of or reducing the cost of an aircraft 86. Similarly, one or more of apparatus embodiments, method embodiments, or a combination thereof may be utilized while the aircraft 86 is in service, for example and without limitation, to maintenance and service 100.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of managing the temperature of heat sensitive material located near a repair patch being thermally cured on a composite skin using a heating blanket, the method comprising:
   configuring an assembly of thermally conductive cooling blocks to fit within a space between the heating blanket and the heat sensitive material, wherein certain of the cooling blocks comprise at least one through-hole allowing air to pass therethrough, and wherein the assembly of cooling blocks is configured to comprise:
      at least one layer of cooling blocks with no through-holes;
      at least one layer of cooling blocks with one through-holes;
      at least one layer of cooling blocks with more than one through-holes; and
   installing the assembly of thermally conductive cooling blocks against the skin within the space, forming a heat sink that conducts a portion of heat out of the composite skin away from the heat sensitive material, wherein the layer of cooling block with no through-holes is closest to the composite skin.

2. A method of managing the temperature of heat sensitive material located near a repair patch being thermally cured on a composite skin using a heating blanket, the method comprising:
   configuring an assembly of thermally conductive cooling blocks to fit within a space between the heating blanket and the heat sensitive material; and
   installing the assembly of thermally conductive cooling blocks against the skin within the space, forming a heat sink that conducts a portion of heat out of the composite skin away from the heat sensitive material.

3. The method of claim 2, wherein the configuring includes:
   placing the cooling blocks in an arrangement of rows and columns, and
   holding the cooling blocks in the arrangement.

4. The method of claim 2, wherein the configuring includes forming through-holes in at least certain of the cooling blocks allowing air to pass therethrough.

5. The method of claim 4, including drawing heat away from the cooling blocks by forcing air through the through-holes.

6. The method of claim 4, further comprising arranging the cooling block such the through-holes are aligned to form continuous air passageways through the cooling block assembly.

7. The method of claim 4, further comprising arranging the cooling blocks in a number of layers, wherein cooling blocks in layers closest to the composite skin have a fewest number of through-holes, and cooling blocks in layers farthest from the composite skin have a greatest number of through-holes.

8. The method of claim 2, further comprising:
   disassembling the assembly of the cooling blocks; and
   reassembling the cooling blocks in another configuration.

9. The method of claim 2, wherein the cooling blocks are formed of one of:
   copper, and
   aluminum.

10. The method of claim 2, wherein the cooling blocks include interconnections coupling the cooling blocks together, and wherein the interconnections are releasable to allow the shape of the assembly of the cooling blocks to be reconfigured.

11. The method of claim 10, wherein the interconnections include one of:
   ways and gibs formed in each of the cooling blocks,
   pins between the cooling blocks,
   snap fit fasteners,
   magnets, and
   a conductive adhesive between the cooling blocks.

12. The method of claim 2, further comprising arranging the cooling blocks to absorb heat radiated by the heating blanket.

13. The method of claim 2, wherein each block comprises one or more recessed magnets, wherein magnets in adjacent cooling blocks are aligned with and attract each other, holding the cooling blocks together in the assembly by magnetic forces.

14. The method of claim 2, wherein each block comprises one or more raised locating balls on a bottom surface and one or more indexing recesses on a top surface, wherein the indexing recesses are configured to receive locating balls on another block to located and position layers of cooling bocks relative to each other.

15. A method of managing the temperature of heat sensitive material, the method comprising:
   configuring an assembly of thermally conductive cooling blocks to fit within a predetermined volume of space between a heat source and the heat sensitive material, wherein the heat source and heat sensitive material are connected by a physical structure; and
   installing the assembly of thermally conductive cooling blocks against the physical structure within the space, forming a heat sink that conducts a portion of heat out of the physical structure away from the heat sensitive material.

16. The method of claim 15, wherein the configuring includes forming through-holes in at least certain of the cooling blocks allowing air to pass therethrough.

17. The method of claim 16, including drawing heat away from the cooling blocks by forcing air through the through-holes.

18. The method of claim 16, further comprising arranging the cooling blocks in a number of layers, wherein cooling blocks in layers closest to the composite skin have a fewest number of through-holes, and cooling blocks in layers farthest from the composite skin have a greatest number of through-holes.

19. The method of claim 15, wherein the cooling blocks include interconnections coupling the cooling blocks together, and wherein the interconnections are releasable to allow the shape of the assembly of the cooling blocks to be reconfigured.

20. The method of claim 15, further comprising arranging the assembly of cooling blocks to absorb heat radiated by the heating blanket.

* * * * *